Aug. 30, 1949.  J. P. REYNOLDS  2,480,610
ROOM HEATER WITH OVEN
Filed Dec. 16, 1944  3 Sheets-Sheet 3

Inventor
John Paul Reynolds,
By Martin T. Fisher,
Attorney.

Patented Aug. 30, 1949

2,480,610

UNITED STATES PATENT OFFICE 2,480,610

ROOM HEATER WITH OVEN

John Paul Reynolds, Chattanooga, Tenn.

Application December 16, 1944, Serial No. 568,524

1 Claim. (Cl. 126—4)

This invention is improved household heater, provided with an oven and arranged also to take in cool air from the room, heat such air and deliver such heated air into the room.

The principal object of the invention is to provide an efficient and economical heater, arranged to heat an oven placed below the fire box.

Another important object of the invention is to provide a heater which will take in cool air from the room, heat it, and deliver it upwardly, thereby effectively heating the room by setting up a circulation of warmed air therein.

Another object of the invention is to provide a combined heater containing an oven below the fire box, in which the hot gas from the top of the heater serves to heat the air of the room by conduction and radiation, the hot gas then containing down to and underneath the oven, for heating it.

More particularly, the heater comprises a fire box in the upper part of the heater; a gas space just above the fire box; the hot gas from this space passes downwardly through a heating jacket, which has a lower inlet and an upper outlet for cool air from the room. The room air, as it passes upwardly through the jacket, is heated and is delivered upwardly, creating a convection current which sets up a circulation of warm air in the room and so heats it. The hot gas, after passing through the heating jacket, then passes down alongside the oven, heating its side walls, then is passed underneath the oven, for heating the bottom, and then passes up back of the rear wall of the oven, for heating such rear wall, passing thence to a gas exit and to the chimney.

The amount of hot gas used as just described, is controlled by a damper positioned in the hot gas space above the fire box, which serves to direct all the hot gas on its heating circuits, as just described, or it may direct any desired proportion of such hot gas into the heating circuit, the rest of the hot gas going directly to the gas exit; thereby giving a control of the oven heat and of the air jacket heat.

Further advantages of structure and operation will be apparent from the accompanying drawings, showing a heater built in accordance with my invention.

Figure 1:
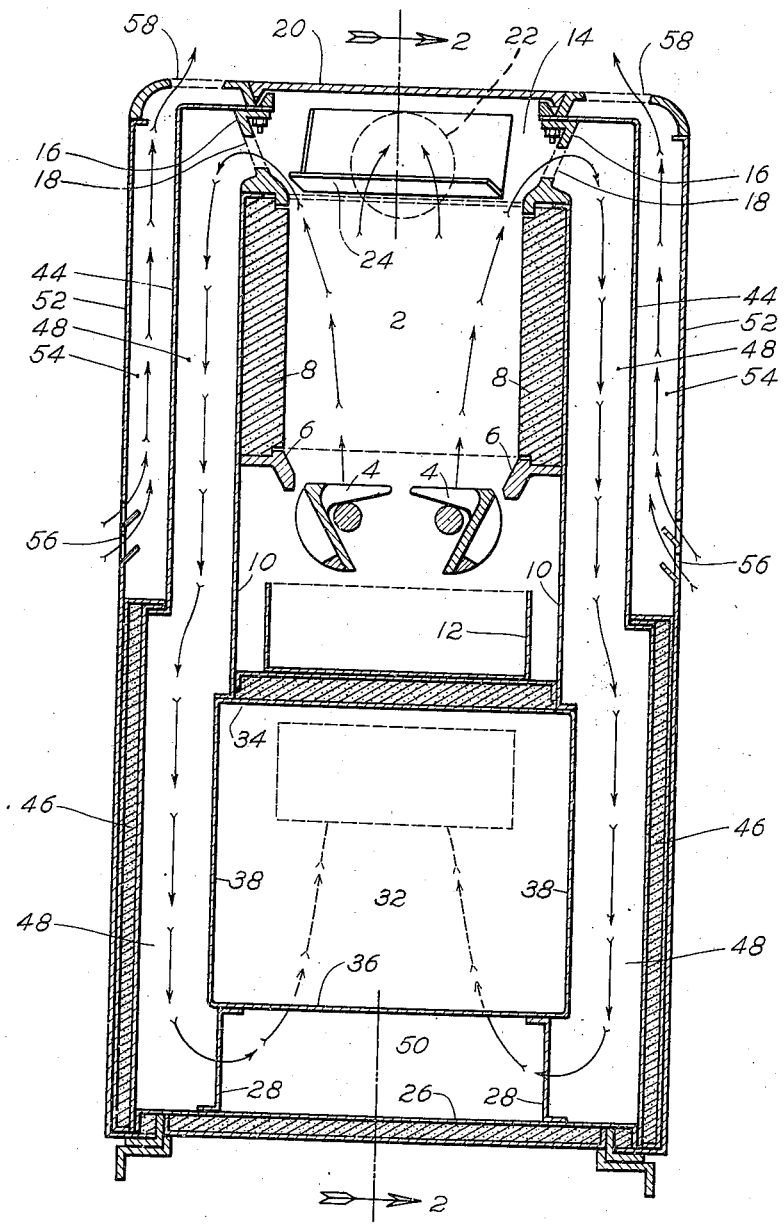
Fig. 1 is a transverse, vertical, cross-sectional view of the improved heater of the present invention, taken on about the line 1—1 of Fig. 2.

Referring now to these figures, in which similar reference characters indicates similar parts, the heater comprises a fire box indicated generally at 2, defined by a grate 4, a grate frame 6 and side and end refractory walls 8 mounted within side walls 10 and front and rear walls 11.

Below the fire box is an ash pan 12, and above the grate is a gas space indicated generally at 14, defined by division plates 16 provided with gas escape slots 18 and by the top 20 of the heater. A gas exit opening 22 communicating with gas space 14, opening 22 being controlled by a pivoted damper 24 which, as is usual with dampers, may be set in closed, open or any intermediate position. If the damper is open, hot gases from the space 14 pass out through the gas exit 25.

Figure 3:
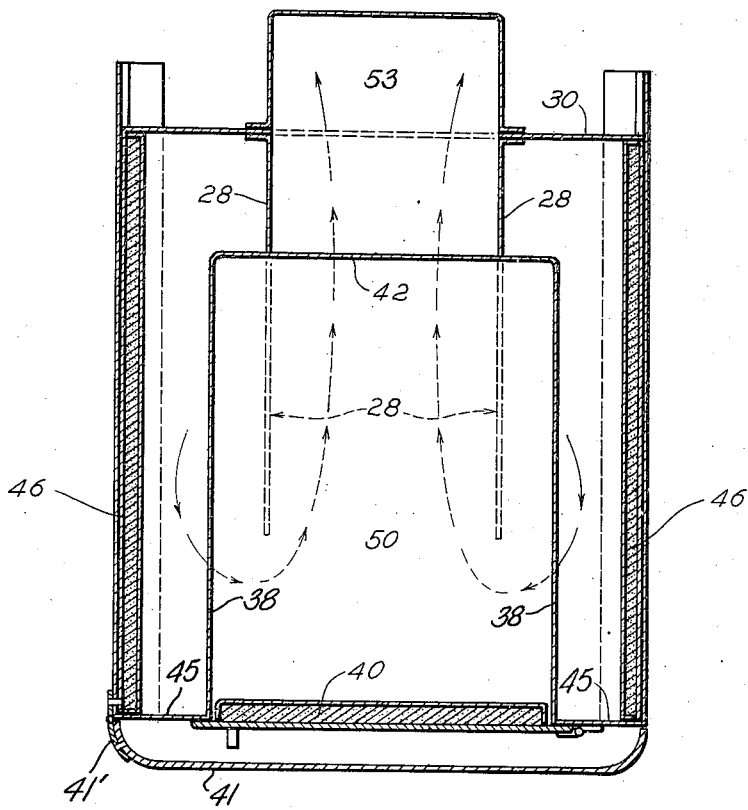
Fig. 3 is a horizontal, cross-section, taken on about the line 3—3 of Fig. 2.

The heater further comprises an insulated bottom 26 on which is mounted vertical partitions 28, which extend from the rear wall 30 of the heater about two thirds of the way to the front, as shown in Fig. 3.

The partition members 28 support an oven indicated generally at 32. The oven is directly below the fire box 2 and comprises a top wall 34, a bottom wall 36, side walls 38, a door 40 and a rear wall 42. A casing door 41 is preferably provided at the front of the stove, hinged thereto by hinges 41'. The ash pan 12 is positioned just above the oven, as shown.

Vertically extending housing walls 44 and insulated walls 46, together with back housing walls 10 and 30, front housing wall 45 and oven walls 38, cooperate to definite downwardly extending heating flues 48 which lead hot gas from the gas space 14 vertically downward alongside the side walls of the oven, these gases then being guided by the partitions 28 into a flue space 50 under the oven, thereby heating the bottom thereof; the gases then pass upwardly through the rear passageway 53 to the gas exit 25, heating the rear wall 42 of the oven on its way to the gas exit.

Wall 44 is inset with respect to wall 46, as shown in Fig. 1.

The heating jacket, for heating the cool air of the room, which forms an important feature of this invention, is defined by the walls 44 and by outer walls 52 spaced outwardly therefrom to define a passageway 54 which is heated by conduction and radiation from the hot walls 44. Outer wall 52 is coextensive with the inset wall 44, and is substantially flush with the lower wall 46.

Cool air from the room enters the heating jacket through louvre openings 56 near the lower part thereof, passing upwardly through the heating space 54, then being projected into the room through the openings 58 in the top of the stove, thereby creating an upwardly directed current of warm air which will circulate through the room and warm parts of the room even at some distance from the stove. More cold air is drawn in through the openings 56.

Figure 2:
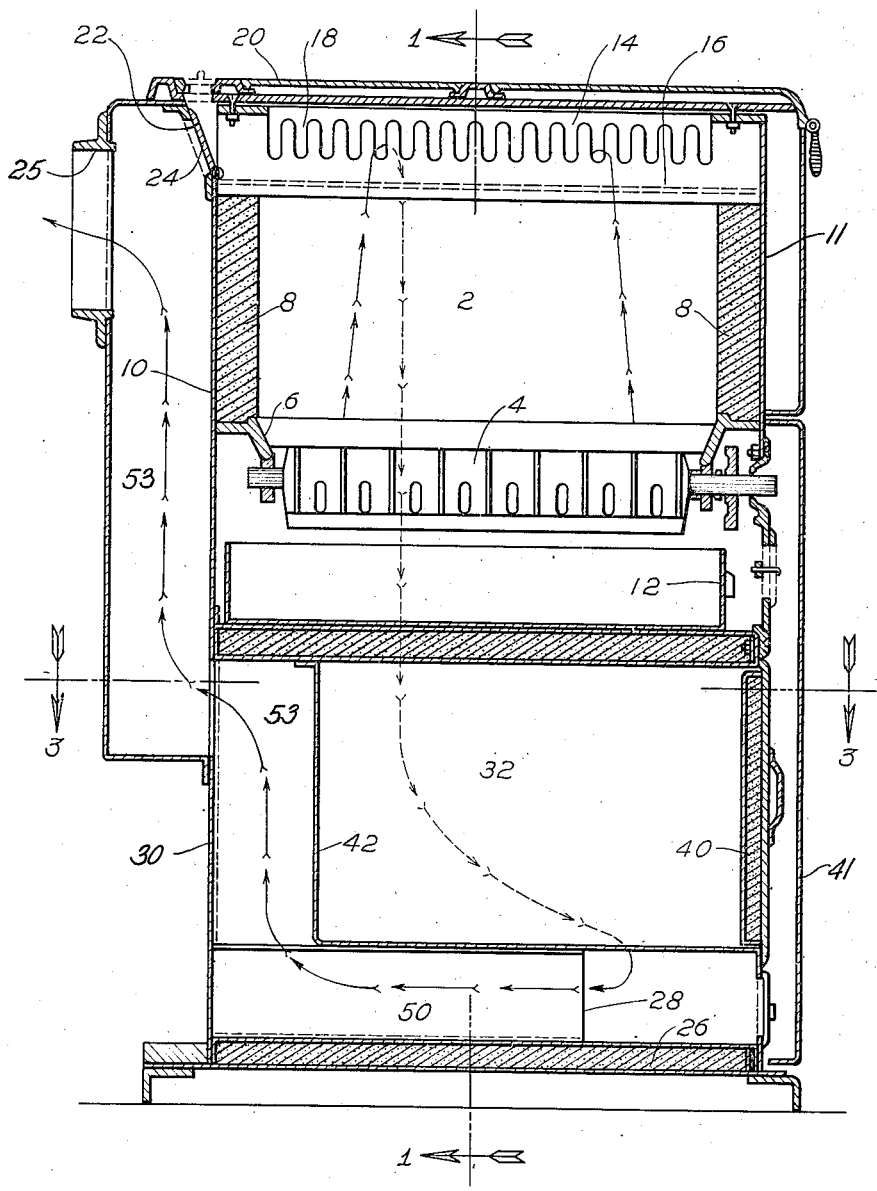
Fig. 2 is a longitudinal, cross-sectional view, taken on the line 2—2 of Fig. 1.

In operation, and with the damper 22 closed as in Fig. 2, hot gases from the gas space 14 pass downwardly through the flues 48 alongside the side walls of the oven, then underneath it and up in contact with the back wall, thereby heating it on four sides. At the same time, cold air is drawn through the heating jacket and passes upwardly through the heating passages 54, being heated by conduction and radiation from hot walls 44. The hot gases move downwardly in 48, in countercurrent relation with the cool air moving upwardly in jacket 52, and are tempered or cooled slightly, so that the oven will not be overheated. The amount of heat passing downwardly through the flues 48 can evidently be controlled by the setting of the damper 22 in any position intermediate its closed and open positions.

With the described arrangement, an extremely compact heater is provided, and by virtue of the positioning of the oven below the fire box, the oven is efficiently heated by heating the side and back walls as well as the underside thereof. The heating jacket projects warm air upwardly into the room and creates a definite convection current therethrough and serves to heat even remote parts of the room.

With the construction shown, where the heating jacket wall 52 is flush with the lower, outer wall 46, the heater has smooth and pleasing lines and can be made into an attractive and pleasing article for household use. The fire box as shown is particularly for burning coal, coke or wood, but an oil burining unit could, of course, be used in the fire box, if desired.

While the heater of the present invention has been described in some detail, it should be understood that the invention is not to be limited to these precise details, but may be carried out in other ways.

I claim as my invention:

A combined room heater and oven, comprising a fire box, a pair of division plates extending from front to back of the heater and supported on the upper side walls of the fire box, said division plates provided with a series of gas escape openings, an oven below the fire box, walls, the upper ends of which are supported by the upper ends of said division plates for forming the outer walls of downwardly extending flues for receiving hot gases through the openings in the division plates and leading such gases around and under said oven, an outer wall spaced from the upper part of said flue-defining walls to form a heating jacket, said outer wall being provided with lower and upper air inlet and outlet openings, whereby said downwardly travelling hot gases and said upwardly travelling room air move in countercurrent, heat-exchanging relationship, in the zone of said heating jacket.

JOHN PAUL REYNOLDS.

REFERENCES CITED

The following references are of record in the file of this patent:

UNITED STATES PATENTS

| Number | Name | Date |
|---|---|---|
| 100,992 | Doyle | Mar. 22, 1870 |
| 378,019 | Rowe | Feb. 14, 1888 |
| 610,941 | Erben | Sept. 20, 1898 |
| 2,180,788 | Berkheimer | Nov. 21, 1939 |
| 2,330,495 | Karges | Sept. 28, 1943 |
| 2,410,576 | Esson | Nov. 5, 1946 |

FOREIGN PATENTS

| Number | Country | Date |
|---|---|---|
| 33 | Germany | July 7, 1877 |
| 350,386 | Germany | Mar. 18, 1922 |